(12) United States Patent
Varkey et al.

(10) Patent No.: US 9,484,132 B2
(45) Date of Patent: Nov. 1, 2016

(54) COAXIAL CABLES WITH SHAPED METALLIC CONDUCTORS

(75) Inventors: Joseph Varkey, Sugar Land, TX (US); Vadim Protasov, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 733 days.

(21) Appl. No.: 13/811,899

(22) PCT Filed: Jul. 27, 2011

(86) PCT No.: PCT/US2011/045458
§ 371 (c)(1),
(2), (4) Date: Apr. 26, 2013

(87) PCT Pub. No.: WO2012/015868
PCT Pub. Date: Feb. 2, 2012

(65) Prior Publication Data
US 2013/0202259 A1    Aug. 8, 2013

Related U.S. Application Data

(60) Provisional application No. 61/400,604, filed on Jul. 30, 2010.

(51) Int. Cl.
*H01B 13/016* (2006.01)
*G02B 6/44* (2006.01)
*H01B 13/22* (2006.01)
*H01B 7/02* (2006.01)
*H01B 7/04* (2006.01)
*H01B 11/18* (2006.01)

(52) U.S. Cl.
CPC ......... *H01B 13/0165* (2013.01); *G02B 6/4415* (2013.01); *H01B 7/02* (2013.01); *H01B 13/225* (2013.01); *H01B 7/046* (2013.01); *H01B 11/1808* (2013.01); *Y10T 29/49123* (2015.01)

(58) Field of Classification Search
CPC .... H01B 13/0165; H01B 7/02; H01B 7/046; H01B 13/225; H01B 11/1808; G02B 6/4415; Y10T 29/49123; Y10T 29/49117; Y10T 29/4987
See application file for complete search history.

(56) References Cited

U.S. PATENT DOCUMENTS

| 8,933,330 | B2 * | 1/2015 | Hayashishita ..... H01B 11/1895 174/28 |
| 2002/0029896 | A1 | 3/2002 | Yokoi et al. |
| 2007/0107928 | A1 | 5/2007 | Varkey et al. |
| 2008/0142244 | A1 | 6/2008 | Head |
| 2009/0046983 | A1 * | 2/2009 | Varkey .................. G02B 6/443 385/113 |
| 2009/0139744 | A1 | 6/2009 | Varkey et al. |

OTHER PUBLICATIONS

International Search Report for PCT Application Serial No. PCT/US2011/045458 dated Feb. 17, 2012.

* cited by examiner

*Primary Examiner* — Sarang Afzali
(74) *Attorney, Agent, or Firm* — Trevor Grove

(57) ABSTRACT

A coaxial cable that has a cable core is encased in a polymeric layer. The cable core is enclosed with a pair of semi-circular-profile shaped conductors. A layer of polymer is extruded over the shaped conductors. A pair of armor wire layers is cabled about the layer of polymer to form the coaxial cable.

9 Claims, 4 Drawing Sheets

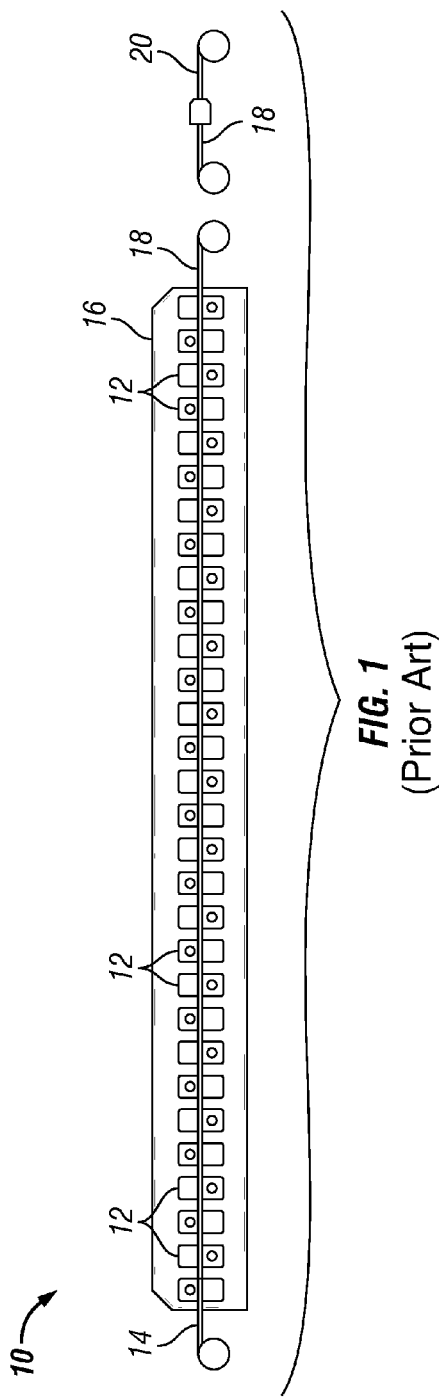
FIG. 1 (Prior Art)
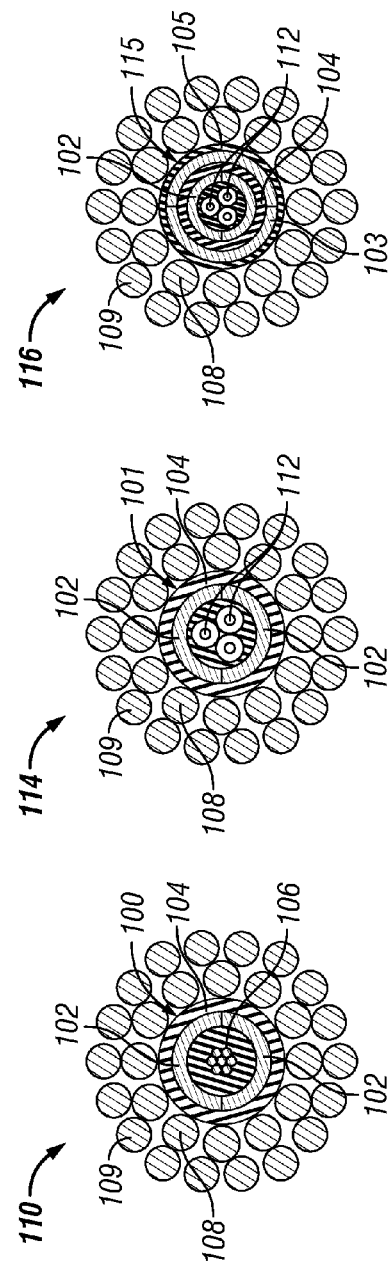
FIG. 2
FIG. 3
FIG. 4

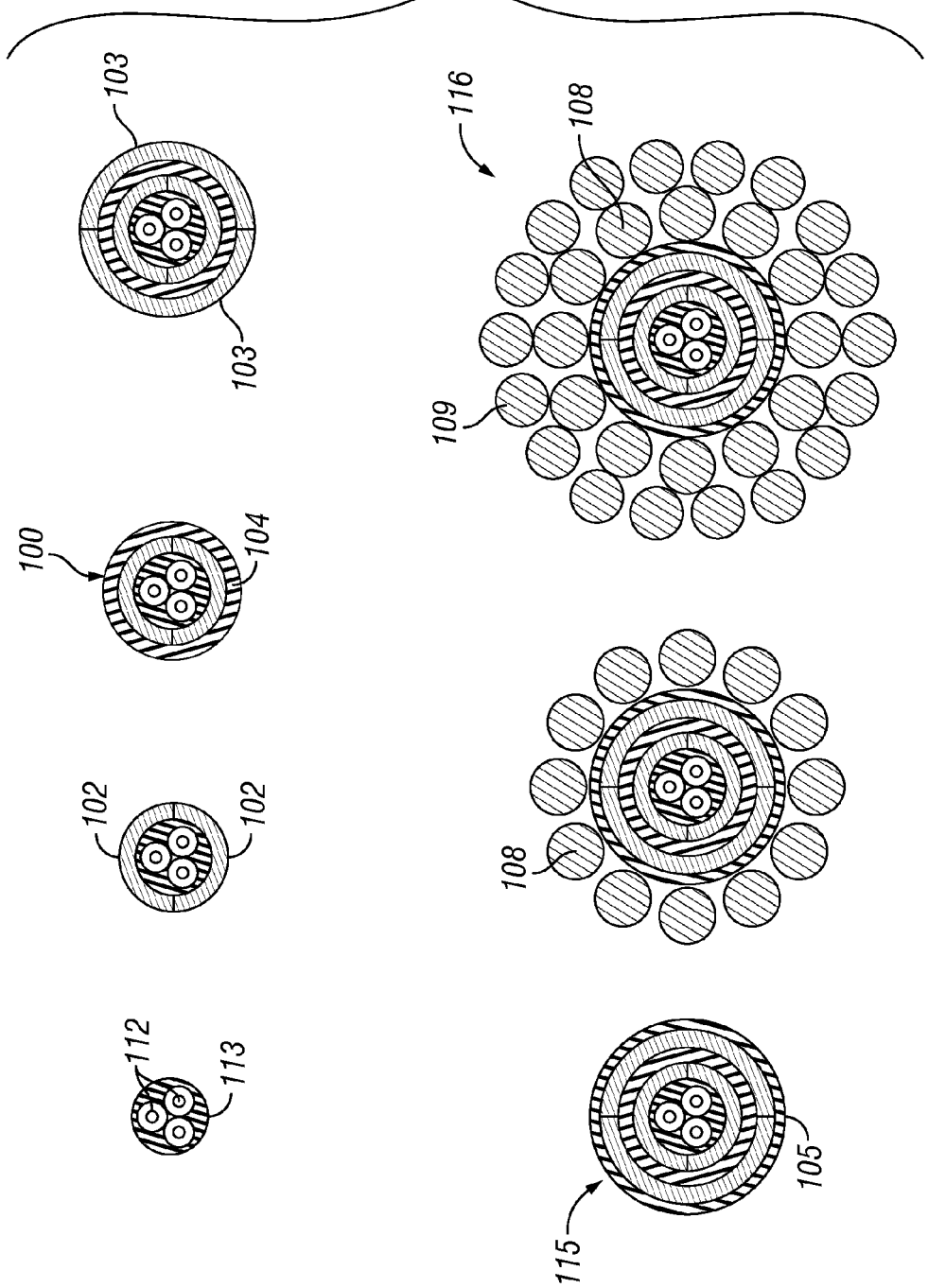

COAXIAL CABLES WITH SHAPED METALLIC CONDUCTORS

FIELD

The disclosure is related in general to wellsite equipment such as oilfield surface equipment, oilfield cables and the like.

BACKGROUND

Currently, coaxial cable manufacture is a tedious, time-intensive, expensive process requiring a great deal of complex machinery. A drawback to the process is in cabling the thin-wire-braiding shielded conductor onto the cable core. As shown in FIG. 1, a typical traditional coaxial cable manufacturing process 10 may comprise a series of thirty spools 12 of thin wire rotating in alternating directions around a central insulated conductor 14. The machinery 16 required may be complex and may require a large footprint in a manufacturing facility. The process may also be tedious to set up and must run slowly to minimize breakage of the thin wires used. Manufacturing a 24,000-foot cable may take 48 hours for the wire braiding process alone. The cable 18 must then be transferred to a separate line where the outer insulation 20 is extruded over the braiding. This process may require an additional six hours. Terminating the braided wire conductor to downhole tools may also be a complex process.

It remains desirable to provide improvements in wireline cables and/or downhole assemblies.

BRIEF DESCRIPTION OF DRAWINGS

FIG. 1 depicts a prior art method

FIG. 2 depicts an embodiment of a cable with a coaxial cable core.

FIG. 3 depicts an embodiment of a cable with optical fibers.

FIG. 4 depicts an embodiment an embodiment of a cable with two pairs of shaped wires.

FIG. 8 depicts stages of a process of manufacturing the embodiment of the cable of FIG. 4.

DETAILED DESCRIPTION

Figure 5:
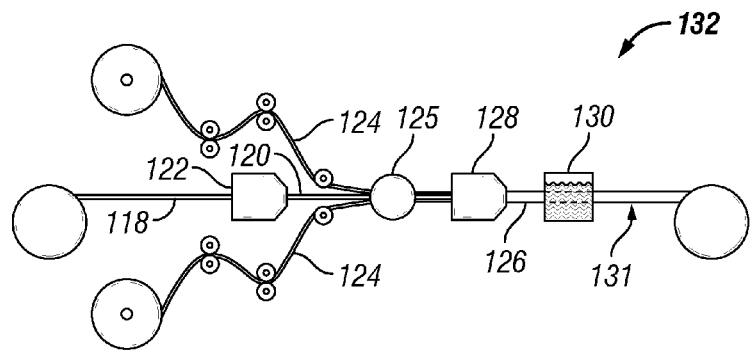
FIG. 5 depicts a single process of manufacturing a cable.

Referring now to FIG. 2, a coaxial cable core 100 may be formed using a polymer-insulated, stranded conductor placed between two semi-circular-profile shaped metallic wires or conductors 102. The cable core 100 is held in place by extruding a polymeric jacket 104 over the shaped wires 102 as they come together over the central stranded conductors 106. Bare or jacketed armor wire strength members, in an inner layer 108 and an outer layer 109 (which may be solid strength members or stranded strength members) are placed over the cable core 100 to complete the cable 110. In operation, an electrical signal is passed down the central conductor 106 with a return path on the shaped wires 102.

Referring to FIG. 3, optical fibers, such as a plurality of optical fibers 112 are placed inside the semi-circular-profile shaped metallic wires or conductors 102 with a polymeric jacket 104 over the shaped wires 102. Bare or jacketed armor wire strength members, in the inner layer 108 and the outer layer 109, (which may be solid strength members or stranded strength members) are placed over the cable core 101 to complete the cable 114. In operation, telemetry is provided on the optical fibers 112 and an electrical signal is passed down the shaped wires 102 with a return path on the armor wire strength members 108.

Referring again to FIG. 4, a second layer of insulated shaped wires or conductors 105 and a second layer of polymer 115 is added to the cable 114, in FIG. 3, to form the cable 116. The second layer of conductors 105 provides an insulated electrical return path for the cable 116.

In contrast to the process shown in FIG. 1, the embodiments described herein may take a bare central stranded conductor 118, such as the conductor 106, apply insulation 120 from an extruder 122 over that conductor, discussed in more detail below, apply two semi-circular shaped wires or conductors 124, such as the conductors 102, over the insulation 120 (which take the place of the braided wires) in a forming machine 125, and then apply an outer layer of insulation 126 from an extruder 128 to form a cable core, such as the cable core 131, in a single pass or process 132, as shown in FIG. 5.

The cable core 131 may be passed through a water bath 130 after the outer layer of insulation 126 is applied. This entire process 132 may take approximately six hours for a 24,000-foot cable core (as opposed to fifty-four hours for a typical conventional process), is far less complicated, and takes up a much smaller footprint on the shop floor. As compared to the braided wires, the semi-circular wires 124 may also be much easier to terminate to downhole tools.

Figure 6:
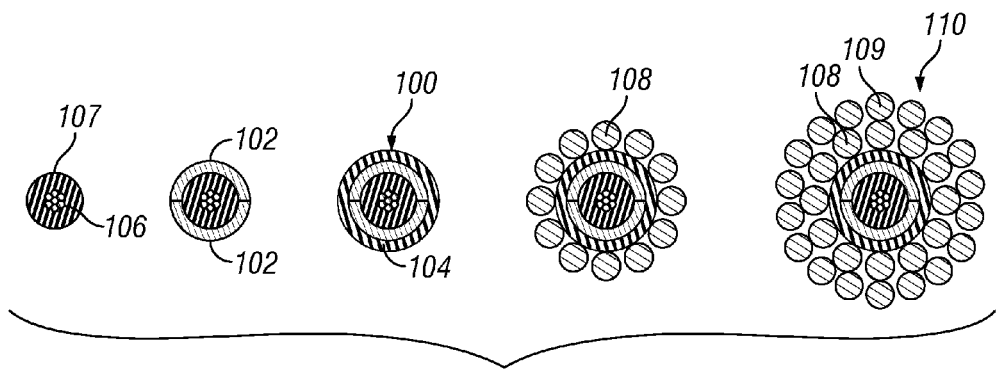
FIG. 6 depicts stages of a process of manufacturing an embodiment of the cable of FIG. 2.

Referring now to FIG. 6, the coaxial cable, such as cable 110 in FIG. 2, with polymer-insulated stranded conductor inside half-shell-profile shaped metallic wires or conductors is disclosed. A polymer 107-insulated stranded metallic conductor 106 is placed at the center of the cable 110, two semi-circular-profile shaped wires 102 are added with inner profiles combining to match the outer diameter of the polymer-insulated conductor, a layer of polymer 104 is extruded (such as by the extruder 128) over the shaped wires 102 to hold them together as the shaped wires 102 come together over the central conductor 107, 106. An inner layer 108 of armor wire strength members is cabled helically over and slightly embedded into the polymeric layer 104 over the shaped wires 102 and an outer layer 109 of armor wire strength members is cabled over and counter-helically to the inner armor wire layer 108 to form the cable 110.

Figure 7:
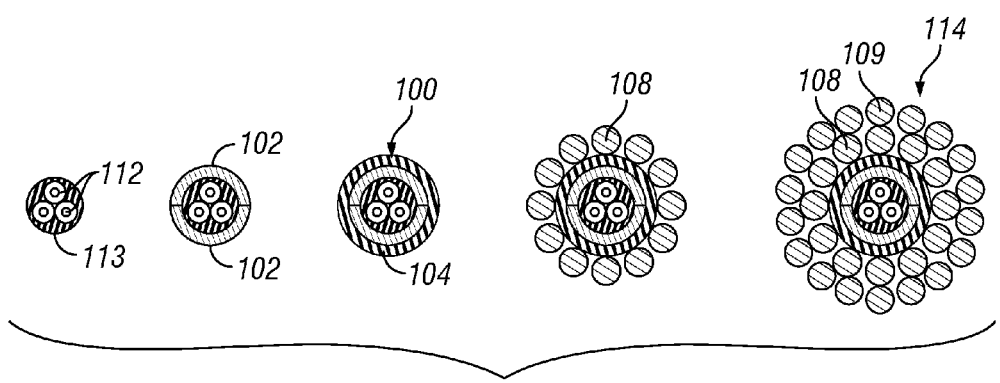
FIG. 7 depicts stages of a process of manufacturing the embodiment of the cable of FIG. 3.

Referring now to FIG. 7, a coaxial cable, such as cable 114 in FIG. 3, with optical fibers inside half-shell-profile shaped metallic wires is disclosed. A number of optical fibers 112 encased in a filler or polymer 113 are placed at the center of the cable 114. The optical fibers and filler or polymer 113 may be brought together in the same manufacturing line (or location), such as by utilizing an extruder 122, or may be cabled together in the filler or polymer 113 in a separate process. The two semi-circular-profile shaped wires 102 are added with inner profiles combining to match the outer diameter of the optical fibers 112 and filler or polymer 113. If the optical fibers 112 and filler or soft polymer 113 have been brought together immediately prior to applying the shaped wires 102, sufficient soft filler or polymer 113 is used to completely fill all interstitial spaces between the optical fibers 112 and the shaped wires 102. As the shaped wires 102 come together over the optical fibers 112, a layer of polymer 104 is extruded, such as by the extruder 128, over the shaped wires 102 to hold them together and form the cable core 101. The application of the polymer 113, the shaped wires 102, and the layer of polymer 104 may be performed in the same process. An inner layer 108 of armor wire strength members is cabled helically over and slightly embedded into the polymeric layer 104 over the shaped wires 102 and an outer layer 109 of armor wire strength members is cabled over and counter-helically to the inner armor wire layer 108 to form the cable 114.

Referring now to FIG. 8, the coaxial cable, such as cable 116 of FIG. 4, is disclosed. A number of optical fibers 112 encased in a filler or soft polymer 113 are placed at the center of the cable 116. The optical fibers 112 and filler or polymer 113 may be brought together in the same manufacturing line (or location), such as by utilizing an extruder 122, or may be cabled together in the filler or polymer jacket 113 in a separate process. The two semi-circular-profile shaped wires 102 are added with inner profiles combining to match the outer diameter of the optical fibers 112 and the filler or polymer 113. If the optical fibers 112 and filler or polymer 113 have been brought together immediately prior to applying the shaped wires, sufficient soft filler or polymer 113 is used to completely fill all interstitial spaces between the optical fibers 112 and the shaped wires 102. As the shaped wires 102 come together over the optical fibers 112, a layer of polymer 104 is extruded over the shaped wires 102, such as by the extruder 128, to hold them together and form the cable core 101. The two semi-circular-profile shaped wires 103 are added with inner profiles of the shaped wires 103 combining to match the outer diameter of the optical fibers 112, filler or polymer 113, the shaped wires 102, and layer of polymer 104. This second pair of shaped wires 103 may be offset from the first pair of shaped wires 102 by about 90 degrees to prevent preferential bending in the completed cable 116. If the shaped wires 103 and cable core 101 have been brought together immediately prior to applying the shaped wires 103, the polymer layer 104 will be used to completely fill all interstitial spaces between the shaped wires 102 and 103. As the shaped wires 103 come together over the cable core 101, an additional layer of polymer 105 is extruded, such as by the extruder 128, over the shaped wires 103 to hold them together and form the cable 115. The application of the filler or polymer 113, the shaped wires 102 and 103, and the layers of polymer 104 and 105 may be performed in the same process. An inner layer 108 of armor wire strength members is cabled helically over and slightly embedded into the polymeric layer 105 over the outer layer of shaped wires 103. An outer layer 109 of armor wire strength members is cabled over and counter-helically to the inner armor wire layer 108 to form the cable 116. The strength members 108, 109 may be solid members (as shown), or stranded armor wire members.

Figure 9A:
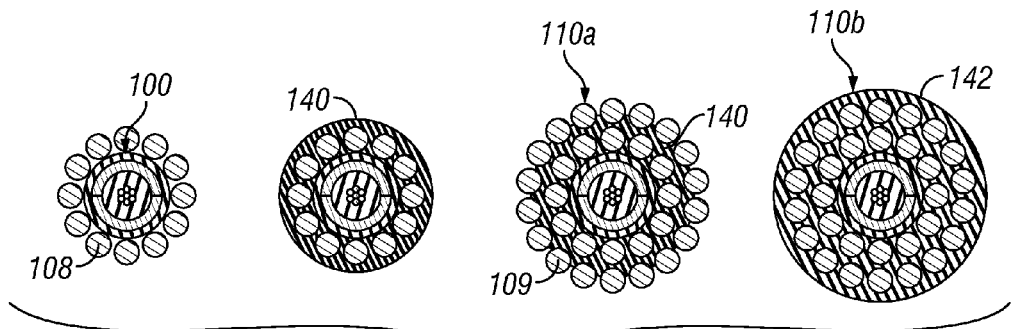
FIG. 9a depicts an embodiment of a coaxial cable.
Figure 9B:
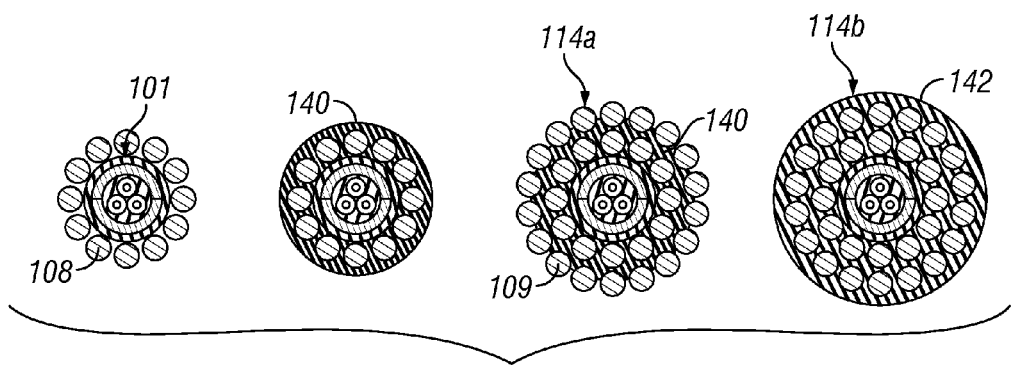
FIG. 9b depicts an embodiment of a fiber optic cable.
Figure 9C:
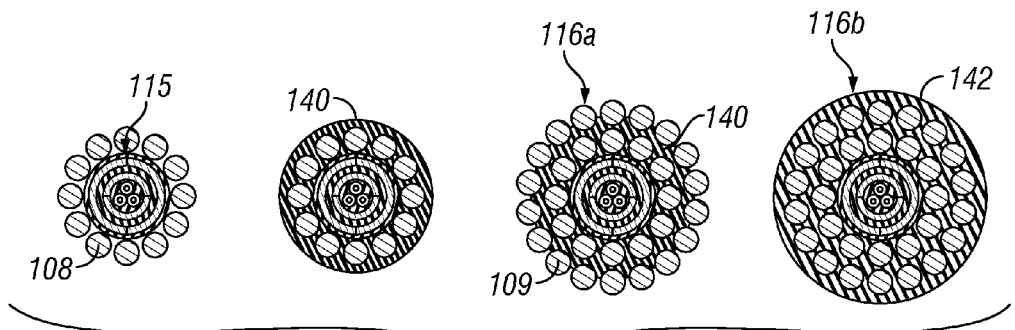
FIG. 9c depicts an embodiment of a cable with two pairs of shaped wires.

Referring now to FIGS. 9a, 9b, and 9c, polymeric-jacketing options for the armor wire strength member layers 108, 109 of the cables 110, 114, and 116 are disclosed. Depending on application requirements, the armor wire strength members 108, 109 of the cables 110, 114, and 116 may be partially or completely jacketed with pure polymer or polymer amended with short fibers, discussed in more detail below.

As shown in FIGS. 9a 9b, and 9c, an inner layer 108 of armor wire strength members is cabled helically over the cable cores 100, 101, and 115. Preferably immediately prior to cabling, the cable core 100, 101, or 115 passes through a heat source, such as an infrared heat source, to allow the armor wires 108 to be partially embedded into the softened polymer, after which a layer of polymer 140 is extruded over the inner armor wire layer 108. This layer of polymer 140 may be pure polymer or may be polymer amended with short fibers. An outer layer 109 of armor wire strength members is cabled over and counter-helically to the inner armor wire layer 108. Immediately prior to cabling, the cable core 100, 101, and 115 and the inner armor wire layer 108 passes through a heat source, such as an infrared heat source, to allow the armor wires 109 to be partially embedded into the softened polymer 140 to form the cables with internal jacketing 110a, 114a, and 116a, where the process would stop.

For a completely jacketed cable, the process would continue wherein the cable 110a, 114a and 116a has a final layer of polymer 142 is extruded over the outer armor wire layer 109 of the cable 110a, 114a, and 116a to form the jacketed cables 110b, 114b, and 116b. This final layer of polymer 142 may be pure polymer or may be amended with short fibers.

The formed cables described herein can be wireline cables, seismic cables, or slickline cables.

The preceding description has been presented with reference to present embodiments. Persons skilled in the art and technology to which this disclosure pertains will appreciate that alterations and changes in the described structures and methods of operation can be practiced without meaningfully departing from the principle, and scope of this invention. Accordingly, the foregoing description should not be read as pertaining only to the precise structures described and shown in the accompanying drawings, but rather should be read as consistent with and as support for the following claims, which are to have their fullest and fairest scope.

We claim:

1. A method for manufacturing a coaxial cable, comprising:

providing a cable core comprising at least one optical fiber encased in a polymeric layer;

enclosing the encased cable core with a first pair of shaped conductors, wherein the first pair of shaped conductors comprise a first semi-circular-profile shaped metallic wire and a second semi-circular-profile shaped metallic wire, and wherein the enclosing comprises engaging the shaped conductors of the first pair of shaped conductors about the encased cable core at a first pair of opposite joint lines extending along a longitudinal axis of the cable core to form an inner circular profile about the encased cable core;

extruding an inner layer of polymer over the inner circular profile of the first pair of shaped conductors; and placing a second pair of shaped conductors about the inner layer of polymer; wherein placing the second pair of shaped conductors about the inner layer of polymer comprises forming an outer circular profile of shaped conductors by engaging a first outer semi-circular-profile shaped metallic wire with a second outer semi-circular-profile shaped metallic wire of the second pair of shaped conductors about the inner layer of polymer at a second pair of opposite joint lines extending along the longitudinal axis of the cable core to form the outer circular profile about the inner layer of polymer;

extruding an outer layer of polymer over the outer circular profile of the second pair of shaped conductors;

cabling a first armor wire layer about the outer layer of polymer; and cabling a second armor wire layer about the first armor wire layer to form the coaxial cable.

2. The method of claim 1 further comprising extruding an additional layer of polymer over the first armor wire layer prior to cabling the second armor wire layer.

3. The method of claim 2 further comprising heating the additional layer of polymer prior to cabling the second armor wire layer.

4. The method of claim 3 further comprising extruding a final layer of polymer over the second armor wire layer.

5. The method of claim 1 wherein the encased cable core comprises a plurality of optical fibers.

6. The method of claim 1 wherein the first pair of opposite joint lines are radially offset from the second pair of opposite joint lines by a predetermined amount.

7. The method of claim 1 wherein the formed coaxial cable is a wireline cable.

8. The method of claim 1 wherein the formed coaxial cable is a seismic cable.

9. The method of claim 1 wherein the formed coaxial cable is a slickline cable.

* * * * *